Aug. 16, 1960    R. H. BISSELL    2,949,363
PROCESS FOR INCREASING THE SOLUBILITY OF POWDERED MILK
Filed Nov. 21, 1955
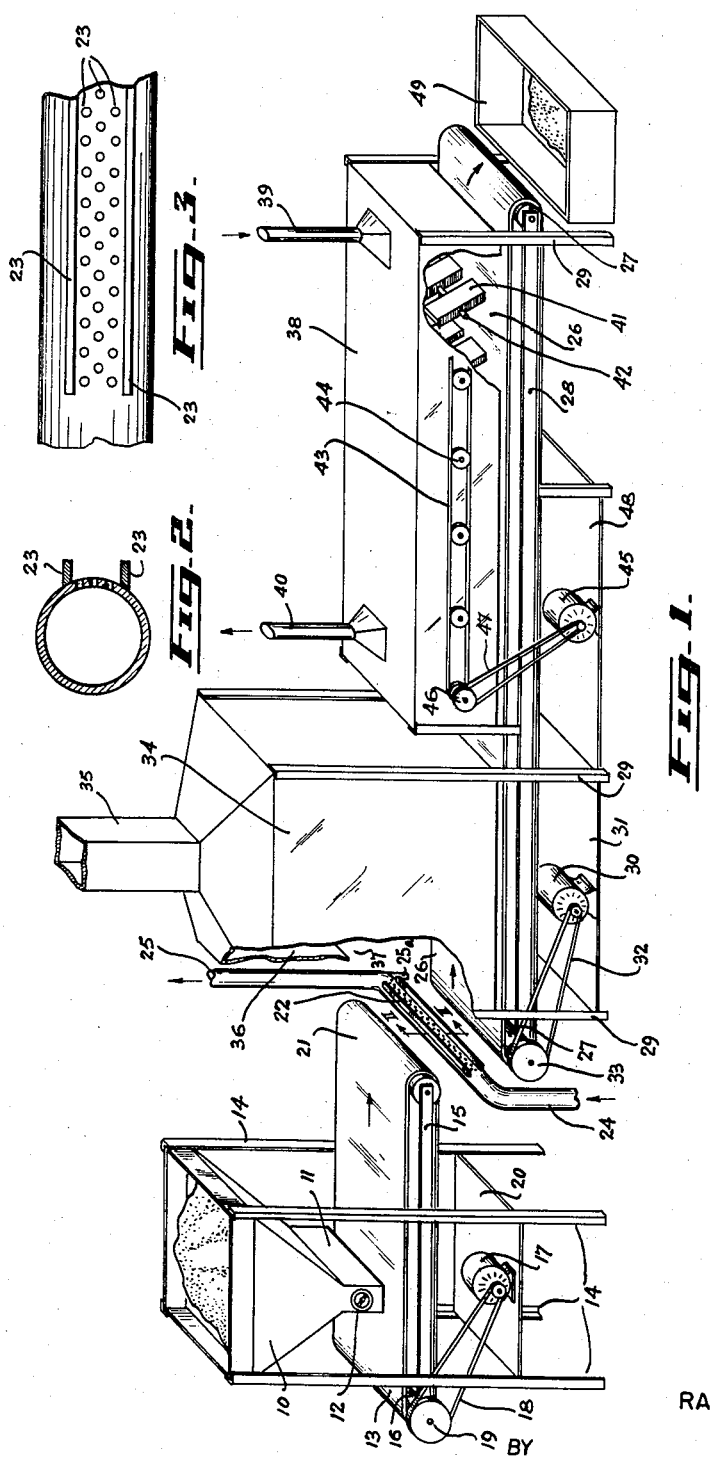
INVENTOR.
RAY H. BISSELL
BY
ATTORNEYS United States Patent Office 2,949,363
Patented Aug. 16, 1960

2,949,363
PROCESS FOR INCREASING THE SOLUBILITY OF POWDERED MILK

Ray Hartley Bissell, Hamilton, Ontario, Canada, assignor to Mil-ko Products Limited, Hamilton, Ontario, Canada, a corporation of Canada Filed Nov. 21, 1955, Ser. No. 547,939

Claims priority, application Canada Feb. 17, 1955

6 Claims. (Cl. 99—56)

This invention relates to a process and apparatus for converting finely divided particles of powdered milk, a substantial proportion of the lactose of which is in the form of the beta anhydride into readily soluble powdered milk having a larger particle size than the finely divided starting material and in which a greater percentage of the lactose is in the form of the alpha hydrate.

The conventional commercially available powdered milk which is usually prepared by spray drying skim or sometimes whole milk, is difficultly soluble in water. This is inconvenient and time consuming particularly where a large batch is to be dissolved and a lumpy effect often results due to incomplete solution of the powdered milk. A "burned milk" taste often results especially with whole milk powder. In addition the spray-dried product is hygroscopic with consequent difficulties of handling, storage and shipment.

It has previously been proposed in Canadian Patent 334,208, which issued to D. D. Peebles et al. on July 18, 1933, to convert the lactose to the form of the alpha hydrate by treating the spray-dried product with water. The water is sprayed into a rotating drum for a period of about 45 minutes, and further treatment is continued for several hours. Mention is made of the possibility of using steam instead of water.

The foregoing process is time consuming and unsuitable as a continuous process. The conversion of the anhydride to the hydrate is not substantially uniform and complete and the working necessary to obtain reasonably uniform moisture distribution breaks down the fragile particles of the product giving a product which is in the form of finely divided particles. If steam is used in the foregoing process to hasten the reaction time the protein of the milk may be damaged and the steam contact for a prolonged period gives a "burned milk" taste.

The object of this invention is to provide an improved process and apparatus for converting a substantial portion of the lactose of the powdered milk to the alpha hydrate which is suitable for use as a continuous process and which provides a product of large particle size and in which there has been an improvement rather than an impairment to the taste of the product.

It has been found in accordance with this invention that if the starting material is treated with steam for a short period of time the reaction temperature can, for example, be as high as 190° F. to 200° F. without damage to the protein content and consequent impairment of the taste, although temperatures of reaction in excess of about 150° F. could not be used with longer reaction times without damaging the taste. It has further been found that the particles of the starting material can be uniformly treated by forming the starting material into a thin wide screen-like stream, causing this stream to fall under the influence of gravity and, while the stream is falling, impinging steam against a surface of the stream throughout the full width of this surface. This gives substantially uniform conversion of the particles to the hydrated form to produce clusters of readily wettable particles. If a condensed stream of particles were used some of the particles would be over treated and others unreacted. The particles on the outside would form a protective layer to prevent steam obtaining access to the particles in the interior. Part of the particles would be treated at a low reaction temperature and the reaction would have to be continued for a sufficient period to damage others of the particles. It is not necessary where the method of this invention is used to work the product to give uniform moisture distribution and therefore the product is retained as large porous clusters of particles which are more readily wetted than finely divided particles.

In accordance with another aspect of this invention, it has been found that the steam treated particles can surprisingly be dried at about 150° F. to 180° F. without damage to the taste.

In the drawings which illustrate the preferred embodiment of this invention.

Figure 1 is a perspective view of an apparatus in accordance with this invention.

Figure 2 is a detailed sectional view on the line II—II of Figure 1 showing the steam nozzle.

Figure 3 is a front elevation view of the steam nozzle shown in Figure 2.

Referring now to the drawings the finely divided particles of powdered milk which are to be treated in accordance with this invention are fed into feed hopper 10 which has a long, narrow discharge outlet 11 and suitable means for controlling the discharge from the discharge outlet operated by handle 12. A horizontal continuous conveyor belt 13 is located beneath feed hopper 10 to receive the discharge from the outlet 11. A suitable supporting framework for hopper 10 and conveyor belt 13 is provided shown in Figure 1 as consisting in four upright members 14, and a pair of transverse members 15. Conveyor belt 13 is mounted on a pair of rollers 16 which are journalled on transverse frame members 15. One of rollers 16 is driven by motor 17 through drive belt 18 and pulley 19. Motor 17 is mounted on platform 20 which is supported by upright frame members 14.

The finely divided particles of milk are spread on the surface of conveyor belt 13 as a thin wide stream which falls under the influence of gravity as a screen-like layer when it reaches the discharge end 21 of conveyor belt 13. A steam nozzle 22, shown in detail in Figures 2 and 3, is located immediately beneath the discharge end 21 of the conveyor belt. The steam nozzle has a series of spaced horizontally directed apertures 23 which extend substantially the width of conveyor belt 13 so that steam issuing from the nozzle will impinge uniformly against a surface of the screen of falling particles. Projecting lips 23 above and below the series of apertures tend to prevent the particles from blocking the apertures. The steam nozzle is supplied by steam inlet and outlet pipes 24 and 25 respectively. A steam trap 25A permits withdrawal of condensate.

A second horizontal continuous conveyor belt 26 is located to receive the milk particles after they have been struck by the steam. Conveyor belt 26 is mounted on rollers 27 which are journalled on the transverse members 28 of a supporting framework which includes upright members 29. A motor 30 mounted on platform 31 drives conveyor belt 26 through belt 32 and pulley 33. A steam chamber 34 having an exhaust port 35 is disposed over the portion of the belt 26 which is adjacent to belt 13. The wall 36 of steam chamber 34 which faces steam nozzle 22 is a half wall to leave an aperture 37 so that the steam issuing from the steam nozzle and which has passed through the screen of particles will be exhausted by the steam chamber and the steam treated particles will be projected on to the portion of conveyor 26 which is within steam chamber 34.

The steam treated particles are conveyed by conveyor belt 26 to drying chamber 38 which has a warm air inlet 39 and an outlet 40. A series of mixing paddles or beaters 41 mounted on shafts 42 can be provided in the drying chamber to give uniform drying. These paddles 41 are rotated in the same direction as the movement of belt 26 by driving belt 43 acting on pulleys 44 and motor 45 which drives double pulley 46 through belt 47. Motor 45 is mounted on platform 48. The material which is discharged from belt 26 has been fully processed and is shown in Figure 1 to fall into receptacle 49. Alternatively the material can be handled in any suitable manner such as by a second conveyor carrying the material to an apparatus for packaging the product.

The manner in which the apparatus in Figures 1 to 3 inclusive can be used in carrying out the process of this invention will now be discussed and exemplified.

The starting material which is placed in the hopper is preferably conventional spray dried powdered skim milk having for example a density of approximately 9.6 gm./cu. in., a moisture content of 2 to 3% and a particle size distributed predominantly (about 50%) in the 150 to 200 mesh size and with about 80% of the particles passing through 100 mesh (Tyler screen sizes). A substantial proportion of the lactose of this starting material, for example 60%, is in the form of the beta anhydride. The small particle size gives poor wettability and makes the starting material difficultly soluble in water. This invention is also applicable to the treatment of powdered whole milk of a similar fine particle size and with a substantial proportion of its lactose as the beta anhydride.

The feed is, for example, adjusted so that a layer of milk powder about ½ inch thick and about 3 feet wide is placed on belt 13 which moves at about 10 feet per minute. The steam which can be at a pressure of about 15 p.s.i. strikes the falling screen of particles at the discharge end of conveyor 13 and reacts with the falling particles at a temperature of about 190° F. to 200° F. in a fraction of a second converting a substantial portion of the lactose from the beta anhydride to the form of the alpha hydrate and causing the particles to form clusters. The steam nozzle should be located immediately below the discharge end of conveyor 13 so that the reaction occurs at the specified temperature of about 190° F. to 200° F. If the steam nozzle is spaced too far from the screen of particles without increase of the steam pressure the reaction temperature will be lowered. The force of the steam projects the particles several feet onto conveyor belt 26 which may conveniently be located about a foot or more below conveyor belt 13. The product then passes into drier 38 where it is dried in about 1½ minutes using agitation by beaters 41 to provide better and more uniform contact between the drying air and the product. The temperature of the drier varies between about 140° F. to 180° F. depending upon the initial moisture and the required moisture content of the finished product. Surprisingly it has been found to be possible to use drying temperatures as high as this after the steam treatment without impairment of the taste of the final product.

The product leaves the drier in the form of a pale yellowish porous light granular material that is readily soluble even in cold water. The density of the product or "instant" milk powder can be varied to suit merchandizing requirements and is typically about 3.0 to 5.5 gms. per cubic inch. The particle size is typically about 20 to 25% minus 100 mesh. When these particles are poured onto water most of the particles immediately break through the surface and become wetted as contrasted with the fine spray-dried starting material a large proportion of which tends to remain on the surface of the water and if stirred form balls consisting of wet powder on the surface with dry powder in the centre. The moisture content of the finished product including both the water of hydration and the water which is mechanically retained is preferably 3 to 4%. A greater percentage of the lactose of the finished product is in the form of the alpha hydrate, for example 50% or less remaining as the beta anhydride. However the product when combined with water is pleasant tasting and does not have a "burned milk" flavour.

What I claim is:

1. A process for converting finely divided particles of powdered milk, a substantial proportion of the lactose of which is in the form of the beta anhydride, into readily soluble powdered milk having a larger particle size than said finely divided powdered milk and with a larger proportion of the lactose in the form of the alpha hydrate comprising the steps of forming said finely divided particles of powdered milk into a thin wide continuous screen like stream falling under the influence of gravity, impinging steam in a substantially horizontal direction against a surface of said stream throughout the full width of said surface while the stream is falling to contact the steam substantially simultaneously and for a short period with substantially all of the particles in a transversely extending portion of the stream thereby converting the finely divided particles into larger particles of powdered milk the lactose of which is to an increased extent in the form of the alpha hydrate, said large particles immediately passing under the combined influence of gravity and the force of said steam to a position where the large particles are out of contact with said steam and immediately removing said larger particles from said position.

2. A process as in claim 1 in which the steam is impinged against one surface of said stream throughout the full width of said surface.

3. A process as in claim 1 including the step of drying said larger particles.

4. A process as in claim 1, in which the steam reacts with the finely divided particles in said transversely extending portion of the stream at a temperature of about 190° F. to 200° F.

5. A process as in claim 2, in which said larger particles are dried at a temperature of between 150° F. and 180° F.

6. A process as in claim 1 in which at least 60% of the lactose of the starting material is in the form of the beta anhydride and less than 50% of the lactose of the final product is in the form of the beta anhydride.

References Cited in the file of this patent

UNITED STATES PATENTS

| | | |
|---|---|---|
| 1,928,135 | Peebles et al. | Sept. 26, 1933 |
| 2,016,592 | Chuck | Oct. 8, 1935 |
| 2,174,734 | Chuck | Oct. 3, 1939 |
| 2,346,500 | Moore | Apr. 11, 1944 |
| 2,832,686 | Louder et al. | Apr. 29, 1958 |
| 2,835,586 | Peebles | May 20, 1958 |
| 2,893,871 | Griffin | July 7, 1959 |